United States Patent Office
3,816,411
Patented June 11, 1974

3,816,411
THIADIAZOLYL AMINO PENICILLINS
Jozsef Schawartz, Tamas Szuts, and Peter Szentmiklosi, Budapest, Hungary, assignors to Chinoin Gyógyszer-és Vegyészeti Termékek Gyára Rt., Budapest, Hungary
No Drawing. Filed Aug. 12, 1971, Ser. No. 171,397
Claims priority, application Hungary, Aug. 12, 1970, Ci–1024
Int. Cl. C07o 99/16
U.S. Cl. 260—239.1
4 Claims

ABSTRACT OF THE DISCLOSURE

A process for the preparation of a penicillin compound of a salt thereof of the formula I

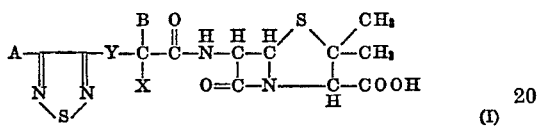

(I)

wherein

A is hydrogen, alkyl having 1 to 4 carbon atoms, aralkyl selected from the group which consists of benzyl and phenylethyl unsubstituted or substituted with chloro, methoxy or ethoxy, or aryl selected from the group which consists of phenyl and naphthyl unsubstituted or substituted with chlorine, methoxy or ethoxy;
B is hydrogen or alkyl having 1 to 4 carbon atoms,
Y is oxygen or sulfur,
X is hydrogen or alkyl having 1 to 4 carbon atoms, which comprises reacting 6-aminopenicillanic acid or a trialkylxylyl ester thereof with a carboxylic acid of the formula II

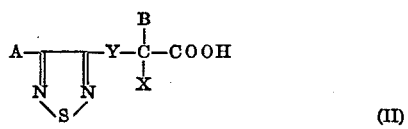

(II)

or a reactive derivative thereof selected from the group which consists of the azides, acid chlorides, acid bromides and anhydrides of said carboxylic acid.

---

The object of the invention is a process for the preparation of new penicillins.

It is known in the art that the N-acyl derivatives of 6-amino-penicillanic acid have an effect similar to that of natural penicillin (G. Erhart-H. Ruschig, Arzneimittel, 1621–1639, 2, 1968). The antibacterial or bactericidal effect can be considerably influenced by varying the acyl group.

It has been found that new penicillins of the general formula I

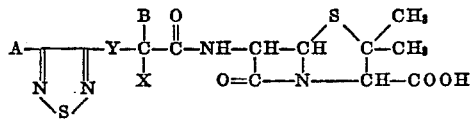

wherein

A is hydrogen, alkyl, aralkyl, substituted aralkyl, aryl, or substituted aryl,
B is hydrogen or alkyl,
Y is oxygen or sulfur,
X is hydrogen or alkyl are highly effective in inhibiting the growth of microorganisms, and are very stable, which is of great advantage in oral administration.

The term "alkyl group" is employed here to indicate straight or branched alkyl groups containing preferably from 1 to 4 carbon atoms, for example methyl, ethyl or isopropyl groups.

When A denotes an aralkyl group, it represents advantageously a benzyl or phenylethyl group.

When A stands for an aryl group, it represents preferably a phenyl or naphthyl group.

The aralkyl or aryl groups in A position may carry one or more substituents, which may be halogen, preferably chlorine, or alkoxy groups, preferably methoxy- or ethoxy groups.

The invention relates to novel penicillins of the general formula I which are prepared by reacting 6-amino-penicillanic acid, or a salt or an ester thereof, in aqueous or anhydrous medium with a carboxylic acid of the general formula II

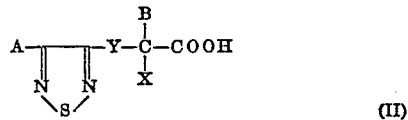

(II)

or a reactive derivative thereof—in the formula, A, B, X and Y have the same meaning as above—and the penicillins so obtained are isolated, if desired, in the form of their salts.

In a preferable mode of realization of the process according to the invention one can employ the azides, halogenides (e.g. acid chlorides, acid bromides), the anhydrides, preferably mixed anhydrides of the acids of the general formula II. The mixed anhydrides may be prepared from carboxylic acids and chloro-carbonic acid esters.

As 6-amino-penicillanic acid ester one can employ the trialkyl-silyl-derivatives of 6-amino-penicillanic acid, in which case the decomposition of the acylated product is carried out in a known manner with water or alcohol. Acylation may be performed in the presence or absence of carbodiimide derivatives, such as for example dicyclohexyl-carbodiimide, diisopropyl-carbodiimide and the like.

The 1,2,5-thiadiazolyl-3-O-alkane-carboxylic acids substituted in 4 position, or their S-substituted derivatives, used for the preparation of the novel penicillins according to the invention, are new compounds. They may be obtained for example from the known 3-hydroxy-1,2,5-thiadiazole, 3-hydroxy-4-methyl-1,2,5-thiadiazole, or from 3-hydroxy-4-phenyl-1,2,5-thiadiazole (L. M. Weinstock et al.: J. Org. Chem. 32, 2823 (1967), British Patent Specification 1,154,548).

It has been found that acids of the general formula II may be readily prepared from 4-substituted-3-hydroxy, or 4-substituted-3-mercapto-1,2,5 - thiadiazoles with α-haloalkyl carboxylic acids. In the course of these reactions one can prepare carbonxylic acids of the general formula II, containing an asymmetrical carbon atom in α-position, if one starts from the corresponding α-halo-alkyl-carboxylic acids, while the antipodes may be prepared by appropriate methods from the racemic acid. The epimeric penicillins were also prepared. We were further able to prepare the epimeric penicillins from such optically active acids as d- and 1-[4'-phenyl-1',2',5'-thiadiazolyl-3'-O-]-α - methyl-acetic acid.

The new penicillanic acids are preferably prepared in the form of their alkali salts (Na, K, Ca or Mg) or of their salts formed with nontoxic organic bases (e.g. dibenzyl-ethylene diamine, N-ethyl-pyperidine or dehydroabiethylamine.

The novel compounds according to the invention have a highly active growth-inhibitory effect on microorganisms. Their range of antibacterial effect compares with that of Oxacilline. More particularly, all of these compounds have a marked bacteriostatic effect on gram positive cocci (*Streptococcus pyogenes, Streptococcus viridans, Streptococcus faecalis, Diplococcus pneumoniae,* Staphylococcus and on gram negative cocci (*Neisseria pharyngitidis*), also on gram positive spore bacteria strains (*Bac. subtilis, Bac. cereus*). Titration of the substances was performed with the dilution-in-tube method, as well as with the agar-gel diffusion method. The following table indicates the results thus arrived at:

The method according to the invention is described below more particularly in the following illustrative Examples.

EXAMPLE 1

4.726 g. of (4-phenyl-1,2,5-thiadiazolyl-3)-oxy-acetic acid (M.P.=136–137° C.) dissolved in dry acetone were treated at −15° C. with 0.02 moles of triethylamine. At the same temperature a solution of 2.17 g. of chloroformic acid-ethylester in 20 ml. of acetone were added

TABLE I

| Strains | Sensitivity to oxacilline | Penicillins 1 | 2 | 3 | 4 | 5 | Notes |
|---|---|---|---|---|---|---|---|
| | | Lowest inhibiting concentration in μg. | | | | | |
| *Streptococcus pyogenes:* | | | | | | | |
| 2245/70 | S | >0.15 | >0.15 | >0.15 | >0.15 | >0.15 | Agar-gel diffusion method. |
| OKI 80 077 | S | >0.15 | >0.15 | >0.15 | >0.15 | >0.15 | |
| OKI 80 078 | S | >0.15 | >0.15 | >0.15 | >0.15 | >0.15 | |
| OKI 80 079 | S | >0.15 | >0.15 | >0.15 | >0.15 | >0.15 | |
| OKI 80 080 | S | >0.15 | >0.15 | >0.15 | >0.15 | >0.15 | |
| Str. pyog 1 | S | 0.15 | 0.15 | 0.15 | 0.15 | 0.31 | |
| Str. pyog 2 | FS | 0.31 | 0.62 | 0.62 | 1.25 | 2.5 | |
| Str. pyog 3 | FS | 0.62 | 0.62 | 0.62 | 1.25 | 2.5 | |
| Str. pyog 4 | S | 0.31 | 0.31 | 0.31 | 0.31 | 0.62 | |
| Str. pyog 5 | S | 0.31 | 0.31 | 0.31 | 0.31 | 0.62 | |
| *Streptococcus viridans:* | | | | | | | |
| 2244/70 | FS | 2.5 | 5.0 | 2.5 | 2.5 | 10.0 | Agar-gel diffusion method. |
| 2246/70 | R | 5.0 | 10.0 | 5.0 | R | R | |
| 2370/70 | S | 0.62 | 1.25 | 1.25 | 1.25 | 1.25 | |
| Str. virid 1 | S | 0.15 | 0.15 | 0.15 | 0.15 | 0.15 | |
| Str. virid 2 | S | 0.62 | 1.25 | 1.25 | 1.25 | 1.25 | |
| Str. virid 3 | S | 0.15 | 0.15 | 0.15 | 0.15 | 0.15 | |
| Str. virid 4 | S | 0.62 | 1.25 | 1.25 | 1.25 | 1.25 | |
| Str. virid 5 | S | 0.31 | 0.62 | 0.62 | 0.62 | 0.62 | |
| Str. virid 6 | FS | 2.5 | 5.0 | 2.50 | 2.50 | 5.0 | |
| Str. virid 7 | R | 5.0 | 10.0 | 5.0 | 40.0 | R | |
| *Streptococcus faecalis:* | | | | | | | |
| 1972/70 | R | 6.25 | 50.0 | 6.25 | 25.0 | 50.0 | Dilution in tube method. |
| 1987/70 | R | 3.12 | 12.5 | 3.12 | 12.5 | 50.0 | |
| 2277/70 | R | 6.25 | 25.0 | 6.25 | 25.0 | 50.0 | |
| 2325/70 | R | 6.25 | 50.0 | 6.25 | 25.0 | 50.0 | |
| 2436/70 | R | R | R | R | R | 400.0 | |
| 2469/70 | R | 6.25 | 12.5 | 6.25 | 25.0 | 50.0 | |
| 2529/70 | R | R | R | R | R | 800.0 | |
| 2552/70 | R | 3.12 | 6.25 | 6.25 | 12.5 | 50.0 | |
| 2567/70 | R | 6.25 | 25.0 | 6.25 | 25.0 | 100.0 | |
| Köjáll. 80171 | R | 3.12 | 6.25 | 6.25 | 12.5 | 100.0 | |
| *Diplococcus pneumoniae:* | | | | | | | |
| Pneumo. 1 | S | 0.15 | 0.15 | 0.15 | 0.15 | 0.15 | Agar-gel diffusion method. |
| Pneumo. 2 | S | 0.31 | 0.62 | 0.62 | 0.62 | 5.0 | |
| 2243/70 | FS | 1.25 | 2.5 | 2.5 | 2.5 | 10.0 | |
| 2247/70 | S | 0.31 | 0.62 | 0.62 | 0.62 | 2.5 | |
| 2270/70 | S | 0.15 | 0.31 | 0.31 | 0.31 | 0.31 | |
| 2271/70 | S | 0.15 | 0.15 | 0.15 | 0.15 | 0.62 | |
| 2272/70 | S | 0.31 | 0.62 | 0.62 | 0.62 | 1.25 | |
| 2273/70 | S | 0.15 | 0.31 | 0.31 | 0.31 | 2.5 | |
| 2297/70 | FS | 1.25 | 2.5 | 2.5 | 5.0 | 10.0 | |
| 2298/70 | FS | 1.25 | 2.5 | 2.5 | 2.5 | 10.0 | |
| *Neisseria pharyngitidis:* | | | | | | | |
| 2332/70 | S | 0.62 | 1.25 | 0.62 | 0.62 | 1.25 | Agar-gel diffusion method. |
| 2333/70 | S | 0.31 | 0.62 | 1.25 | 0.62 | 0.62 | |
| 2334/79 | S | 0.31 | 0.62 | 1.25 | 1.25 | 0.62 | |
| 2335/70 | S | 0.62 | 1.25 | 2.5 | 1.25 | 1.25 | |
| 2339/70 | S | 0.15 | 0.62 | 0.62 | 0.62 | 0.62 | |
| 2479/70 | FS | 5.0 | 10.0 | 20.0 | 10.0 | 20.0 | |
| 2481/70 | FS | 1.25 | 2.5 | 10.0 | 2.5 | 10.0 | |
| Pharyngo 1 | FS | 2.5 | 5.0 | 10.0 | 10.0 | 10.0 | |
| Pharyngo 2 | FS | 5.0 | 10.0 | 5.0 | 10.0 | 20.0 | |
| Pharyngo 3 | FS | 2.5 | 5.0 | 5.0 | 5.0 | 10.0 | |
| *Subtilis, Meseuth. Cereus bacillus:* | | | | | | | |
| OKI 100 007 subtilis | R | 12.5 | 25.0 | 12.5 | 25.0 | 100.0 | Dilution in tube method. |
| OKI 100 008 subtilis | S | 100.0 | 200.0 | 200.0 | 200.0 | 1.56 | |
| OKI 101 020 subtilis | S | 50.0 | 3.18 | 50.0 | 6.25 | 0.39 | |
| OKI 101 021 subtilis | S | 12.5 | 3.12 | 3.12 | 3.12 | 0.19 | |
| 1967 subtilis | S | 50.0 | 3.12 | 50.0 | 3.12 | 0.39 | |
| 1968 subtilis | S | 12.5 | 3.12 | 6.25 | 3.12 | 0.39 | |
| 1969 mesenth | R | 50.0 | 50.0 | 50.0 | 100.0 | 200.0 | |
| Cereus 1 | S | 12.5 | 25.0 | 12.5 | 50.0 | 0.39 | |
| Cereus 2 | S | 100.0 | 50.0 | 100.0 | 50.0 | 0.78 | |
| 3664/69 subtilis | R | 100.0 | 100.0 | 100.0 | 100.0 | 200.0 | |

Abbreviations employed: S=sensitive; FS=fairly sensitive; R=resistant.

PENICILLINS

1=6-N-[(4'-phenyl-1',2',5'-thiadiazole-3'-yl)-oxy-acetyl]-aminopenicillanic acid potassium-salt
2=6-N-[d,l- α-(4'-phenyl-1',2',5'-thiadiazole-3'-yl)-oxy-α-methyl-acetyl]-aminopenicillanic acid potassium-salt
3=6-N-[d-α-(4'-phenyl-1',2',5'-thiadiazole-3'-yl)-oxy-α-methyl-acetyl]-aminopenicillanic-acid potassium-salt
4=6-N-[1-α-(4'-phenyl-1',2',5'-thiadiazole-3'-yl(-oxy-α-methyl-acetyl]-aminopenicillanic-acid potassium-salt
5=oxacilline sodium-salt dropwise over a period of 5 minutes, the reaction mixture was stirred for 20 minutes, whereafter the temperature was raised to −5° C.

4.32 g. of 6-amino-penicillanic acid were suspended in 15 ml. of dist. water at 0° C., and the mixture was dissolved by adding 0.02 moles of triethylamine. The solution so obtained was added to the reaction mixture, then stirred for 1 hour in the temperature range of +10° C., diluted with 120 ml. of water and acidified to pH=2 by adding 10 ml. of 6 N hydrochloric acid. The reaction mixture was extracted with a mixture of 50 ml. of ethylacetate and 50 ml. of diisopropylether, then with 50 ml.

of ethylacetate. The organic phase was washed with 3 × 50 ml. of water, and dried over sodium sulphate. A solution of 2 g. of anhydrous potassiumacetate in 20 ml. of anhydrous ethanol was added to the anhydrous solution. The precipitated crystals were allowed to stand for a few hours, filtrated after dilution with 50 ml. of diisopropylether, then covered with acetone. 6.05 g. of 6-N-[4'-phenyl-1',2',5'-thiadiazolyl-3'-O]-acetyl - amino - penicillanic acid potassium salt were obtained, with an M.P. of 190° C., with decomposition. $[\alpha]_D^{20}= +150°$ [c.=2, water]. Iodometric determination showed 19.6 mls. of 0.01 N iodine solution for 10 mg. of the substance.

EXAMPLE 2

To a mixture of 50 ml. of dry benzene and 5 g. of 1-[4-phenyl - 1,2,5 - thiadiazolyl-3-O-]-α-methylacetic acid, with an M.P. of 104° C. and $[\alpha]_D^{20}=-11.5°$ (c.=2, in acetone) and 1 drop of pyridine a solution of 2.5 ml. of thionylchloride in 10 ml. of benzene were added dropwise, in the course of 30 minutes, with boiling. After boiling the mixture for 30 minutes, the benzene was distilled off at atmospheric pressure, and the residual acidic chloride was freed from solvent *in vacuo*. 5.43 g. of a light yellow oil were obtained.

4.32 g. of 6-amino-penicillanic acid were suspended in 60 ml. of water at 0° C., then dissolved by adding 3.32 g. of sodium hydrocarbonate, and diluted with 40 ml. of acetone. The acetone solution of the acid chloride (40 ml.) was added to the sodium salt solution dropwise within 5 minutes at 2° C. The pH of the solution was kept in the range of 6.5 to 8 by adding some mls. of sodium hydrocarbonate. The solution was then diluted with 50 ml. of water, extracted with 2×50 ml. of ether, and acidified with 10 ml. of 5 N phosphoric acid.

The racemic acid mixture was extracted with a mixture of 50 ml. of ether and 50 ml. of ethyl acetate, the organic phase was washed with water until free acid, then dried over sodium sulfate. 23 ml. of a solution of K-2-ethyl-hexanoate in n acetone were added and the solution was allowed to stand for 16 hours at 0° C. The precipitated crystals were filtered, covered with ether and later with acetone, and dried. 4.6 g. of 6-N-[l-(4'-phenyl-1',2',5' - thiadiazolyl-3'-O-)-α-methyl - acetyl]-amino-penicillanic acid potassium salt were obtained, with the M.P. of 205–208° C. with decomposition, $[\alpha]_D^{25}=+132°$ (c.=2, in water). Iodometric determination showed a consumption of 17.7 ml. of 0.01 N iodine solution for 10 mg. of the substance.

EXAMPLE 3

The epimeric 6-N-[d-(4'-phenyl-1',2',5'-thiadiazolyl-3'-O-)-α-methyl - acetyl-aminopenicillanic acid potassium salt may be prepared as described in Example 2. M.P. 208–209° C., with decomposition. $[\alpha]_D^{20}=+163°$ (c.=2 in water).

Iodometric analysis showed a consumption of 17.7 ml. of 0.01 N iodine solution for 10 mg. of the substance.

EXAMPLE 4

One proceeds as in Examples 2 and 3 to prepare 6-N-[d,l-(4'-phenyl - 1',2',5' - thiadiazolyl-3'-O-)-α-methylacetyl]-aminopenicillanic acid potassium salt.
M.P.: 193–194° C. (with decomposition).

$$[\alpha]_D^{20}=+141° C.$$

(c.=2, in water).

Iodometric analysis showed a consumption of 18.3 ml. of 0.01 N iodine solution for 10 mg. of the substance.

What we claim is:
1. A compound of the formula

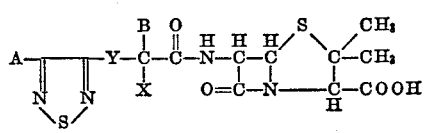

wherein A is chlorophenyl; B is hydrogen; Y is oxygen; and X is hydrogen.

2. The compound defined in claim 1 in the form of its Na, K, Ca, Mg, dibenzyl-ethylenediamine, N-ethylpyridine or dehydroabiethylamine salt.

3. The compound defined in claim 2 and selected from the group which consists of 6-N-[4'-phenyl-1',2',5'-thiadiazolyl-3'-O]-acetyl-aminopenicillanic acid potassium salt and 6-N-[l-(4'-phenyl-1',2',5'-thiadiazolyl-3'-O)-α-methyl-acetyl]-aminopenicillanic acid potassium salt.

4. A compound selected from the group which consists of 6-N-[4'-phenyl-1',2',5'-thiadiazolyl-3'-O]-acetyl-aminopenicillanic acid potassium salt and 6-N-[1-(4'-phenyl-1',2',5'-thiadiazolyl-3'-O)-α-methyl-acetyl] - aminopenicillanic acid potassium salt.

References Cited
UNITED STATES PATENTS

| | | | |
|---|---|---|---|
| 3,322,749 | 5/1967 | Crast | 260—239.1 |
| 3,296,250 | 1/1967 | Fraser | 260—239.1 |
| 3,481,922 | 12/1969 | Holdege | 260—239.1 |
| 3,502,655 | 3/1970 | Oppinger | 260—239.1 |

NICHOLAS S. RIZZO, Primary Examiner

U.S. Cl. X.R.

424—271